Aug. 9, 1949.  F. R. BOOSEY  2,478,363
MEASURING APPARATUS
Filed April 10, 1947  2 Sheets-Sheet 1

INVENTOR.
FREDERICK ROBERT BOOSEY
by Haseltine Lake & Co.
Agents.

Patented Aug. 9, 1949

2,478,363

UNITED STATES PATENT OFFICE 2,478,363

MEASURING APPARATUS

Frederick Robert Boosey, Letchworth, England, assignor to The Sigma Instrument Company Limited, Letchworth, England, a British company Application April 10, 1947, Serial No. 740,637
In Great Britain January 10, 1946

1 Claim. (Cl. 177—351)

This invention relates to measuring apparatus and is applicable in many fields where a gauging movement can be employed to produce corresponding variations in the electrical characteristics of circuit elements included in an indicating electric circuit.

The invention is concerned particularly with measuring apparatus of the kind comprising a first variable impedance and a second variable impedance, such impedances being relatively differentially variable according to the value that it is desired to measure and each such impedance being separately connected in an A. C. circuit including a rectifier bridge, there being one bridge in respect of each such circuit, so that upon the two bridges D. C. potentials develop that vary according to the differential variations of the said impedances, said rectifier bridges being interconnected to allow a D. C. circulating current to flow. A galvanometer, connected between the two conductors which inter-connect the two rectifiers, detects the difference between the two output potentials, the magnitude of the deflection being dependent on the magnitude of the difference (zero deflection signifying equality) and the direction of the deflection depending on which is the greater potential, so that such galvanometer may therefore record the direction and extent of differential variation in said impedances.

Figure 1:
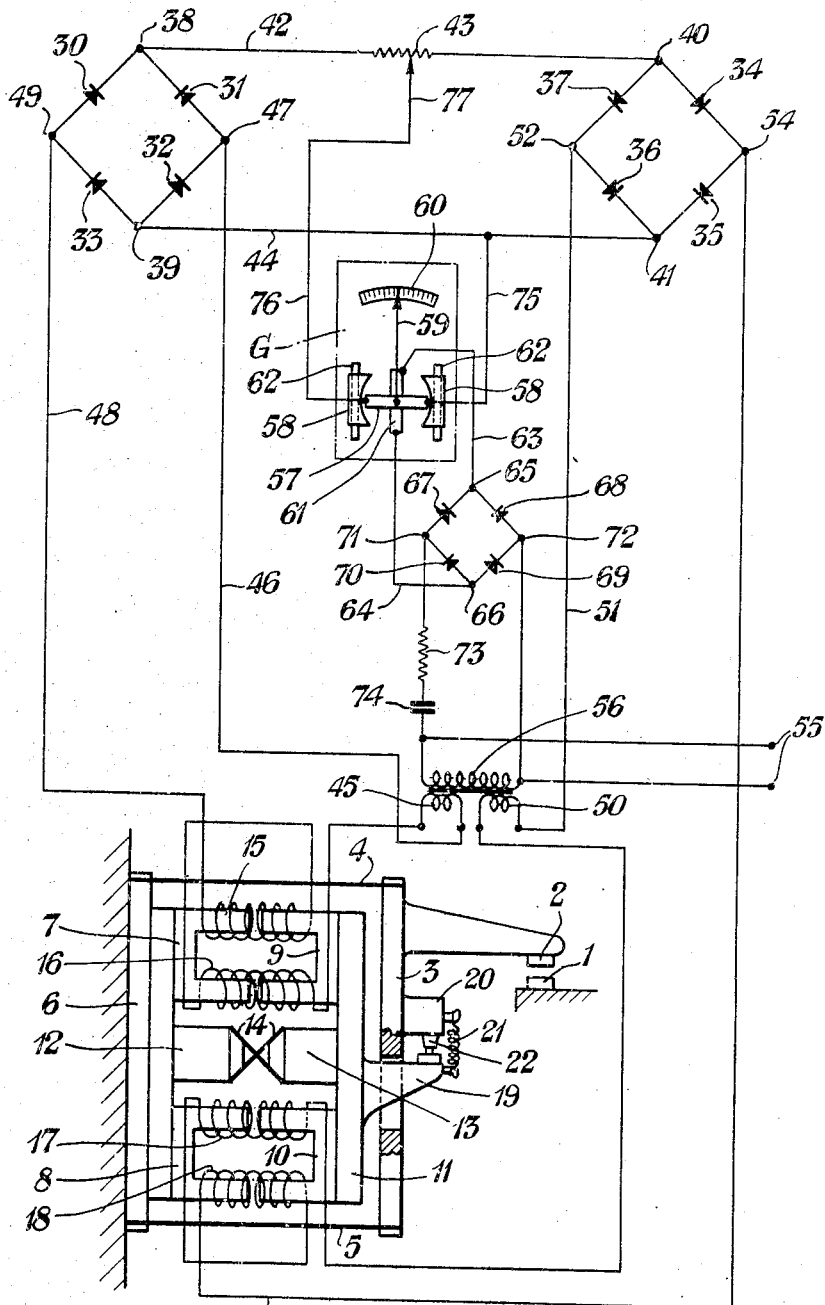
Figure 2:
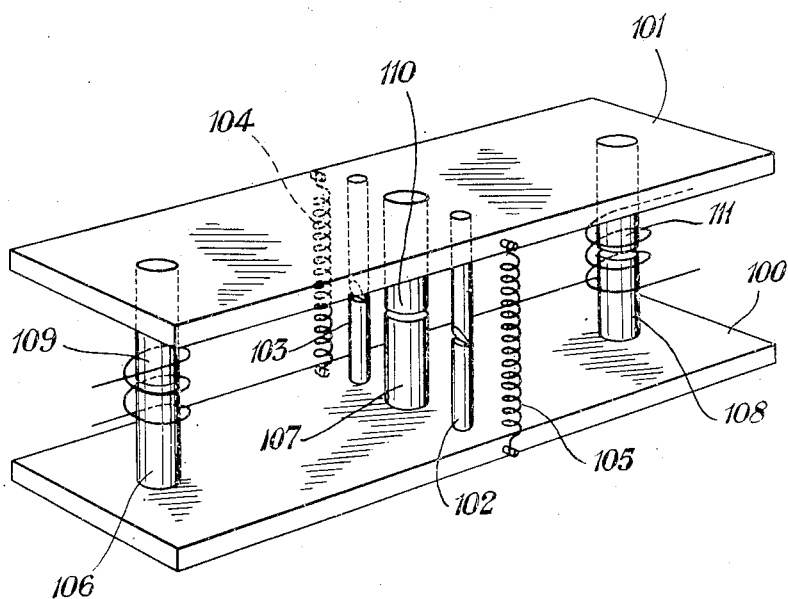

For a better understanding of the nature of the invention and to show how the same may be carried into effect reference will now be made to the accompanying drawings, in which, Figure 1 is an electrical circuit diagram serving also to illustrate diagrammatically certain apparatus, and Figure 2 is a diagrammatic representation of certain modified apparatus.

Referring first to Figure 1, there is a reference anvil 1 and a gauging anvil 2. The anvil 2 is carried upon a supporting bar 3 which is in turn carried by lath springs 4 and 5. The latter are secured in a bed plate member 6, the elements, 3, 4, 5 and 6 constituting effectively the links of a so-called four bar chain. Two U-shaped cores 7 and 8 are disposed to co-operate with a further similar pair 9 and 10. The cores 7 and 8 are secured to the bed plate 6 whereas the cores 9 and 10 are mounted upon a carrier element 11. A stationary block 12 is effectively secured to the bed plate 6, and lies opposite a block 13 that is secured to the carrier element 11. Lath springs 14 arranged in cruciform fashion are anchored at their ends respectively to the blocks 12 and 13, so as to afford a pivotal support for the block 13, the axis of the pivot coinciding with the axis of intersection of the cruciform lath springs 14. The cores 7 and 9 together afford an approximately rectangular magetic circuit having two air-gaps. The cores 8 and 10 afford a similar magnetic circuit similarly possessing two air-gaps. There are windings 15, 16, 17 and 18 which embrace the arms of the cores 7, 8, 9 and 10. The windings 15 and 16 are connected in series, and in a like manner the windings 17 and 18 are connected in series.

The carrier element 11 has an arm 19 which projects through a suitable cut-out in the bar 3. A corresponding arm 20 provided on the bar 3, is constrained to follow the movements of the arm 19 (and vice versa) by a tension spring 21, the arm 20 having a contact piece 22 for engagement with a suitable portion of, or on, the arm 19.

It will now be realised from the description so far given that when the anvil 2 is moved say upwardly in the performance of a gauging movement, then the bar 3 is moved upwardly by flexing of the lath springs 4 and 5. Simultaneously an upward displacement of the arm 20 causes the arm 19 to be upwardly displaced, whereby the carrier element 11 is rocked about the pivotal axis afforded by the cruciform lath springs 14. As a result, the cores 7 and 9 are relatively approached to one another to reduce the air-gaps between them. The air-gaps between the cores 8 and 10 are at the same time increased. The total inductance of the series windings 15 and 16 therefore increases whilst the inductance of the series windings 17 and 18 correspondingly decreases. Hence a differential change in inductance as between the two sets of series windings will occur, the extent of such differential variation depending upon the extent of linear gauging movement of the anvil 2.

The electrical circuit that permits observation of the differential inductance change will now be described. Essentially the circuit comprises two rectifier bridges. The one bridge has rectifiers 30, 31, 32 and 33 whilst the other bridge has rectifiers 34, 35, 36 and 37. It will be observed that the rectifiers 30 and 31 both permit passage of current in a direction towards the junction 38 whilst the rectifiers 32 and 33 both permit current to pass in a direction away from the opposite junction 39. The arrangement of the rectifiers 34 to 37 of the other bridge is such that the junction 40 is of the same character as regards direction of current flow as the junction 39, whereas the opposite junction 41 has the same character as the junction 38 in relation to direction of current flow. Thus the two rectifier bridges are similarly disposed but are inverted as compared with one another. The junctions 38 and 40 are connected by a line 42 in which there is a resistance 43. The junctions 39 and 41 are joined by a line 44.

The series connected windings 15 and 16 are on one side joined to one end of the secondary winding 45 of a transformer. The other end of the secondary winding 45 is joined by a connection 46 to the bridge junction 47. The other side of the series connected windings 15 and 16 is joined by the connection 48 to the opposite bridge junction 49. In like manner, the series connected windings 17, 18 are at one side joined to one end of the secondary winding 50, the other end of such secondary winding being joined by the connection 51 to the bridge junction 52. The other side of the series connected windings 17 and 18 is joined by a connection 53 to the bridge junction 54. There is a source of alternating current supply indicated at 55, such source being connected to the primary winding 56 of the transformer having the secondary windings 45 and 50.

An indicating galvanometer G is provided, this galvanometer preferably being of the kind which forms the subject of my co-pending United States patent application Serial No. 740,636, filed April 10, 1947. The circuit could of course be arranged to operate in conjunction with other kinds of galvanometer, but the use of the galvanometer forming the subject of my co-pending patent application is preferred. In the diagrammatic illustration of the galvanometer G, it is assumed that the galvanometer is seen in plan. Essentially the galvanometer includes a deflection coil 57 arranged to move in a field due to concave pole pieces 58. There is a pointer 59 which co-operates with a suitable scale 60, and it will be recognised that the galvanometer so far described is of the usual D'Arsonval type. Mounted below the deflection coil however, there is a control coil 61 which provides the restoring torque for the deflection coil 57. The control coil 61 moves in a field due to a separate pair of pole pieces 62, which produce a flux distribution that is chosen according to the type of scale 60 that is desired. The control coil 61 is connected for constant excitation from the source 55, in such manner that external variations in the character of the current supplied at the source 55 will be automatically compensated, as will be more fully indicated hereafter. The control coil 61 is joined by connections 63 and 64 with opposite junctions 65 and 66 of a rectifier bridge having rectifiers 67, 68, 69 and 70. It will be observed that the rectifiers 67 and 68 both permit passage of current to the junction 65 whilst the rectifiers 69 and 70 both allow current to flow from the junction 66. The other bridge junctions 71 and 72 are connected across the supply source 55 through a resistance 73 and a condenser 74.

The connections just described, serve for the energisation of the control coil 61, and it remains to indicate that the deflection coil 57 is joined by connections 75 and 76, the connection 75 being carried to the line 44 whilst the connection 76 joins an arm 77 that displaceably contacts the resistance 43.

To consider now the operation of the circuit it will first be supposed that the source 55 is supplying alternating current with the result that both the secondaries 45 and 50 of the transformer are energised. Current therefore passes through both the windings 15 and 16 and an alternating potential is applied at the bridge junction 47 and 49. It will be clear from the described and illustrated circuit arrangement that the one junction 38 will develop one polarity whilst the other junction 39 will develop an opposite polarity. Let it be supposed that the junction 38 becomes positive, then the junction 39 will become negative. The winding 50 will be similarly energised and in a like manner will produce an alternating potential across the bridge junctions 52 and 54 via the windings 17 and 18. The rectifier bridge is in this case inversely arranged and as a result negative potential will develop at the junction 40 and positive potential at the junction 41. Thus the lines 42 and 44 will carry a D. C. circulating current. By adjustment of the arm 77 in relation to the resistance 43, it will therefore be possible to find a zero potential position with reference to the connections 75 and 76. With the arm 77 adjusted in this way no current will flow in the deflection coil 57.

The supply source 55 provides also an alternating potential across the bridge junctions 71 and 72, via the impedance of the condenser 74 and the resistance 73. Polarity therefore develops at the bridge junctions 65 and 66 so that a direct current is supplied via the connections 63 and 64 to the control coil 61.

The description of the operation of the electric circuit so far given deals with the case where the circuit is energised but gauging is not taking place. It will now be supposed that a work-piece is inserted between the anvils 1 and 2 whereby the anvil 2 makes a gauging movement. Such gauging movement produces a corresponding angular movement of the carrier element 11, carrying the cores 9 and 10, in the manner previously described. Let it be supposed that as a result of this angular displacement the air-gaps between the cores 7 and 9 are reduced, whilst those between the cores 8 and 10 are correspondingly increased. The corresponding differential alteration in the inductances due to the coil pairs 15, 16 and 17, 18 will cause the D. C. potential across the bridge junctions 40 and 41 to increase accordingly whilst that across the junctions 38 and 39 correspondingly decreases. Thus a potential difference as between the lines 75 and 76 now exists depending in magnitude upon the extent of angular displacement of the cores 9 and 10, and depending in direction upon the direction of angular displacement of the said cores. The deflection coil 57 of the galvanometer G thus produces a movement of the pointer 59 with reference to the scale 60, and thereby gives the desired indication of the gauging movement.

In the above description reference has been made to the connection of the bridge junctions 71 and 72 across the source 55 (via the resistance 73 and capacitance 74). Alternatively the transformer 56 could have an additional secondary winding for supply of the junctions 71 and 72.

In Figure 2 a more compact form of the differentially variable impedances, is shown. Essentially there is a lower plate 100 associated with a plate 101 which may rock relatively thereto. Rocking is permitted by the pivot pillars 102 and 103 which are held together by tension springs 104 and 105. Pole-pieces 106, 107 and 108 on one plate co-operate with pole-pieces 109, 110 and 111 on the other plate. The poles 107 and 110 are common to both magnetic circuits and there are coils 112 and 113 which permit the differential impedance variation in a manner that will be clear from the description hereinbefore. It will be noted that in this construction two instead of four coils are employed, but the sensitivity is thereby reduced.

The restoring torque exerted by the control coil 61 will of course depend for its constancy upon unchanging voltage and frequency values in the supply at the source 55. If the voltage of the source 55 should change then there would clearly be an alteration in such restoring torque. For an increase in voltage the tendency will be for the restoring torque to increase but on the other hand an increase in voltage would result in an increased D. C. potential at the bridge junctions 38, 39 and 40, 41 with corresponding increase in the potential as between the lines 75 and 76. Hence there will be compensation for a voltage increase of the source 55. There will similarly be compensation for a voltage decrease of the source. As regards frequency changes of the source, an increase in frequency will produce greater sensitivity in the differentially variable inductances for the reason that inductive reactance is a function of frequency (with, of course, all other factors maintained constant). It will be appreciated that capacitative reactance is, however, an inverse function of frequency, and hence the impedance provided by the condenser 74 will tend to fall with increase in frequency. Thus the current in the control coil will increase so as to off-set the increased sensitivity of the differentially variable inductances. In this manner frequency compensation is obtainable depending upon correct choice of the value of the condenser 74.

I claim:

Measuring apparatus comprising a first variable inductance choke possessing a choke winding and a variable air-gap core, a second similar variable choke, a mechanical connecting member between the cores of said first and second variable chokes, measuring means associated with said mechanical connecting member to displace the same according to linear dimensions that are gauged and thereby differentially alter the air-gap setting as between said first variable choke and the second variable choke, a first four-armed rectifier bridge network having a first and second pair of oppositely situated bridge junctions, a series connection from the choke winding of said first variable choke to one of the junctions of said first pair, a source of alternating current supply connected to supply alternating current to the winding of said first variable choke and to the other junction of said first pair of bridge junctions, said first rectifier bridge network having the rectifiers thereof disposed to cause persisting polarity to develop at said second pair of junctions thereof, a second rectifier bridge network similar to the first and possessing also a first and a second pair of opposite bridge junctions, a connection from one of said first pair of bridge junctions of the second rectifier network to the choke winding of said second variable choke, connections from this latter choke winding and the second junction of said first pair of said second rectifier network to said source of alternating current thereby to cause the second pair of junctions of said second rectifier network to develop a persisting polarity, two connecting lines between said second pairs of bridge junctions of both rectifier networks each connecting line extending between junctions of opposite polarity, a potential divider included in one of said connecting lines such potential divider possessing a dividing arm, a galvanometer having a deflection coil connected with the dividing arm of the potential divider and with the other connecting line which does not contain said potential divider, a restoring coil connected for exerting restoring torque upon said deflecting coil of said galvanometer, means for producing a magnetic field for said deflection coil, means for producing magnetic field for said restoring coil, a third rectifier bridge network similar to the other two and possessing two pair of oppositely disposed bridge junctions, connections from said source of alternating current to supply current across one pair of said junctions of the third bridge rectifier network, a capacitive impedance included in the connections between said alternating current source and the pair of the bridge junctions of said third bridge rectifier network, and connections between the other pair of junctions of said third rectifier bridge network to said restoring coil.

FREDERICK ROBERT BOOSEY.

REFERENCES CITED

The following references are of record in the file of this patent:

UNITED STATES PATENTS

| Number | Name | Date |
| --- | --- | --- |
| 2,240,184 | Hathaway | Apr. 29, 1941 |
| 2,394,079 | Langer | Feb. 5, 1946 |
| 2,421,420 | Hathaway | June 3, 1947 |
| 2,434,547 | Browne | Jan. 13, 1948 |

FOREIGN PATENTS

| Number | Country | Date |
| --- | --- | --- |
| 405,043 | Great Britain | Feb. 1, 1934 |
| 548,105 | Great Britain | Sept. 24, 1942 |
| 556,607 | Great Britain | Oct. 13, 1943 |